(12) United States Patent
Hasch et al.

(10) Patent No.: US 7,651,751 B2
(45) Date of Patent: Jan. 26, 2010

(54) BUILDING BOARD

(75) Inventors: Joachim Hasch, Berlin (DE); Stefan Gottfried, Johannesberg (DE)

(73) Assignee: Kronotec AG, Lucerne (CH)

( * ) Notice: Subject to any disclaimer, the term of this patent is extended or adjusted under 35 U.S.C. 154(b) by 112 days.

(21) Appl. No.: 10/521,151

(22) PCT Filed: Feb. 10, 2004

(86) PCT No.: PCT/DE2004/000226

§ 371 (c)(1),
(2), (4) Date: Jan. 13, 2005

(87) PCT Pub. No.: WO2004/071764

PCT Pub. Date: Aug. 26, 2004

(65) Prior Publication Data

US 2005/0266199 A1    Dec. 1, 2005

(30) Foreign Application Priority Data

Feb. 14, 2003   (DE) .................................. 103 06 118

(51) Int. Cl.
*B32B 3/10* (2006.01)
*B32B 21/08* (2006.01)
(52) U.S. Cl. .................... 428/50; 428/54; 428/56; 428/188; 428/223
(58) Field of Classification Search .................... 428/50, 428/53, 54, 56, 44, 106, 537.1, 188, 223
See application file for complete search history.

(56) References Cited

U.S. PATENT DOCUMENTS

| 213,740 | A | 4/1879 | Conner |
|---|---|---|---|
| 623,562 | A | 4/1899 | Rider |
| 714,987 | A | 12/1902 | Wolfe |
| 753,791 | A | 3/1904 | Fulghum |
| 823,843 | A * | 6/1906 | Buyten .................. 428/106 |
| 1,124,228 | A | 1/1915 | Houston |
| 1,407,679 | A | 2/1922 | Ruthrauff |
| 1,454,250 | A | 5/1923 | Parsons |
| 1,468,288 | A | 9/1923 | Een |
| 1,477,813 | A | 12/1923 | Daniels |
| 1,510,924 | A | 10/1924 | Daniels et al. |
| 1,540,128 | A | 6/1925 | Houston |
| 1,575,821 | A | 3/1926 | Daniels |
| 1,602,256 | A | 10/1926 | Sellin |
| 1,602,267 | A | 10/1926 | Karwisch |
| 1,615,096 | A | 1/1927 | Meyers |
| 1,622,103 | A | 3/1927 | Fulton |
| 1,622,104 | A | 3/1927 | Fulton |
| 1,637,634 | A | 8/1927 | Carter |
| 1,644,710 | A | 10/1927 | Crooks |
| 1,660,480 | A | 2/1928 | Daniels |
| 1,714,738 | A | 5/1929 | Smith |

(Continued)

FOREIGN PATENT DOCUMENTS

AT              005566           8/2002

(Continued)

*Primary Examiner*—Alexander Thomas
(74) *Attorney, Agent, or Firm*—Greenblum & Bernstein, P.L.C.

(57) ABSTRACT

A building board for use as a ceiling or wall element in house building is characterized by a plurality of OSBs which are disposed side by side and are bonded together in multiple layers.

10 Claims, 1 Drawing Sheet

U.S. PATENT DOCUMENTS

| | | | |
|---|---|---|---|
| 1,718,702 A | 6/1929 | Pfiester | |
| 1,734,826 A | 11/1929 | Pick | |
| 1,764,331 A | 6/1930 | Moratz | |
| 1,776,188 A | 9/1930 | Langb'aum | |
| 1,778,069 A | 10/1930 | Fetz | |
| 1,779,729 A | 10/1930 | Bruce | |
| 1,787,027 A | 12/1930 | Wasleff | |
| 1,823,039 A | 9/1931 | Gruner | |
| 1,859,667 A | 5/1932 | Gruner | |
| 1,898,364 A | 2/1933 | Gynn | |
| 1,906,411 A | 5/1933 | Potvin | |
| 1,921,164 A | 8/1933 | Lewis | |
| 1,929,871 A | 10/1933 | Jones | |
| 1,940,377 A | 12/1933 | Storm | |
| 1,946,648 A | 2/1934 | Taylor | |
| 1,953,306 A | 4/1934 | Moratz | |
| 1,986,739 A | 1/1935 | Mitte | |
| 1,988,201 A | 1/1935 | Hall | |
| 2,023,066 A | 12/1935 | Curtis et al. | |
| 2,044,216 A | 6/1936 | Klages | |
| 2,065,525 A | 12/1936 | Hamilton | |
| 2,123,409 A | 7/1938 | Elmendorf | |
| 2,220,606 A | 11/1940 | Malarkey et al. | |
| 2,249,590 A * | 7/1941 | Allen | 428/61 |
| 2,276,071 A | 3/1942 | Scull | |
| 2,280,071 A | 4/1942 | Hamilton | |
| 2,324,628 A | 7/1943 | Kähr | |
| 2,328,051 A | 8/1943 | Bull | |
| 2,398,632 A | 4/1946 | Frost et al. | |
| 2,430,200 A | 11/1947 | Wilson | |
| 2,740,167 A | 4/1956 | Rowley | |
| 2,894,292 A | 7/1959 | Gramelspacker | |
| 3,045,294 A | 7/1962 | Livezey, Jr. | |
| 3,100,556 A | 8/1963 | De Ridder | |
| 3,125,138 A | 3/1964 | Bolenbach | |
| 3,182,769 A | 5/1965 | De Ridder | |
| 3,203,149 A | 8/1965 | Soddy | |
| 3,204,380 A | 9/1965 | Smith et al. | |
| 3,267,630 A | 8/1966 | Omholt | |
| 3,282,010 A | 11/1966 | King, Jr. | |
| 3,310,919 A | 3/1967 | Bue et al. | |
| 3,347,048 A | 10/1967 | Brown et al. | |
| 3,460,304 A | 8/1969 | Braeuninger et al. | |
| 3,481,810 A | 12/1969 | Waite | |
| 3,526,420 A | 9/1970 | Brancaleone | |
| 3,538,665 A | 11/1970 | Gohner | |
| 3,553,919 A | 1/1971 | Omholt | |
| 3,555,762 A | 1/1971 | Costanzo, Jr. | |
| 3,608,258 A | 9/1971 | Spratt | |
| 3,694,983 A | 10/1972 | Couquet | |
| 3,714,747 A | 2/1973 | Curran | |
| 3,720,027 A | 3/1973 | Christensen | |
| 3,731,445 A | 5/1973 | Hoffmann et al. | |
| 3,759,007 A | 9/1973 | Thiele | |
| 3,760,548 A | 9/1973 | Sauer et al. | |
| 3,768,846 A | 10/1973 | Hensley et al. | |
| 3,859,000 A | 1/1975 | Webster | |
| 3,878,030 A | 4/1975 | Cook | |
| 3,902,293 A | 9/1975 | Witt et al. | |
| 3,908,053 A | 9/1975 | Hettich | |
| 3,936,551 A | 2/1976 | Elmendorf et al. | |
| 3,988,187 A | 10/1976 | Witt et al. | |
| 4,006,048 A | 2/1977 | Cannady, Jr. et al. | |
| 4,090,338 A | 5/1978 | Bourgade | |
| 4,091,136 A | 5/1978 | O'Brian et al. | |
| 4,099,358 A | 7/1978 | Compaan | |
| 4,118,533 A | 10/1978 | Hipchen et al. | |
| 4,131,705 A | 12/1978 | Kubinsky | |
| 4,164,832 A | 8/1979 | Van Zandt | |
| 4,169,688 A | 10/1979 | Toshio | |
| 4,242,390 A | 12/1980 | Nemeth | |
| 4,243,716 A | 1/1981 | Kosaka et al. | |
| 4,245,689 A | 1/1981 | Grard et al. | |
| 4,246,310 A | 1/1981 | Hunt et al. | |
| 4,290,248 A | 9/1981 | Kemerer et al. | |
| 4,299,070 A | 11/1981 | Oltmanns et al. | |
| 4,426,820 A | 1/1984 | Terbrack et al. | |
| 4,431,044 A | 2/1984 | Bruneau | |
| 4,470,357 A | 9/1984 | Sanzaro | |
| 4,471,012 A | 9/1984 | Maxwell | |
| 4,486,115 A * | 12/1984 | Rionda et al. | 403/283 |
| 4,501,102 A | 2/1985 | Knowles | |
| 4,520,057 A | 5/1985 | Fumio et al. | |
| 4,561,233 A | 12/1985 | Harter et al. | |
| 4,585,685 A | 4/1986 | Forry et al. | |
| 4,612,745 A | 9/1986 | Hovde | |
| 4,641,469 A | 2/1987 | Wood | |
| 4,653,242 A | 3/1987 | Ezard | |
| 4,654,244 A | 3/1987 | Eckert et al. | |
| 4,661,398 A * | 4/1987 | Ellis | 442/295 |
| 4,703,597 A | 11/1987 | Eggemar | |
| 4,715,162 A | 12/1987 | Brightwell | |
| 4,738,071 A | 4/1988 | Ezard | |
| 4,752,497 A | 6/1988 | McConkey et al. | |
| 4,769,963 A | 9/1988 | Meyerson | |
| 4,819,932 A | 4/1989 | Trotter, Jr. | |
| 4,831,806 A | 5/1989 | Niese et al. | |
| 4,845,907 A | 7/1989 | Meek | |
| 4,905,442 A | 3/1990 | Daniels | |
| 4,947,602 A | 8/1990 | Pollasky | |
| 5,029,425 A | 7/1991 | Bogataj | |
| 5,098,762 A * | 3/1992 | Nakajima | 428/106 |
| 5,103,614 A | 4/1992 | Kawaguchi et al. | |
| 5,113,632 A | 5/1992 | Hanson | |
| 5,117,603 A | 6/1992 | Weintraub | |
| 5,136,823 A | 8/1992 | Pellegrino | |
| 5,165,816 A | 11/1992 | Parasin | |
| 5,179,812 A | 1/1993 | Hill | |
| 5,205,091 A | 4/1993 | Brown | |
| 5,216,861 A | 6/1993 | Meyerson | |
| 5,251,996 A | 10/1993 | Hiller et al. | |
| 5,253,464 A | 10/1993 | Nilsen | |
| 5,275,862 A * | 1/1994 | Ramadan et al. | 428/113 |
| 5,283,102 A | 2/1994 | Sweet et al. | |
| 5,295,341 A | 3/1994 | Kajiwara | |
| 5,335,473 A | 8/1994 | Chase | |
| 5,348,778 A | 9/1994 | Knipp et al. | |
| 5,349,796 A | 9/1994 | Meyerson | |
| 5,390,457 A | 2/1995 | Sjölander | |
| 5,413,834 A | 5/1995 | Hunter et al. | |
| 5,433,806 A | 7/1995 | Pasquali et al. | |
| 5,474,831 A | 12/1995 | Nystrom | |
| 5,497,589 A | 3/1996 | Porter | |
| 5,502,939 A | 4/1996 | Zadok et al. | |
| 5,540,025 A | 7/1996 | Takehara et al. | |
| 5,567,497 A | 10/1996 | Zegler et al. | |
| 5,570,554 A | 11/1996 | Searer | |
| 5,597,024 A | 1/1997 | Bolyard et al. | |
| 5,630,304 A | 5/1997 | Austin | |
| 5,653,099 A | 8/1997 | MacKenzie | |
| 5,671,575 A | 9/1997 | Wu | |
| 5,694,734 A | 12/1997 | Cercone et al. | |
| 5,706,621 A | 1/1998 | Pervan | |
| 5,736,227 A | 4/1998 | Sweet et al. | |
| 5,768,850 A | 6/1998 | Chen | |
| 5,797,175 A | 8/1998 | Schneider | |
| 5,797,237 A | 8/1998 | Finkell, Jr. | |
| 5,823,240 A | 10/1998 | Bolyard et al. | |
| 5,827,592 A | 10/1998 | Van Gulik et al. | |
| 5,860,267 A | 1/1999 | Pervan | |
| 5,935,668 A | 8/1999 | Smith | |
| 5,943,239 A | 8/1999 | Shamblin et al. | |
| 5,953,878 A | 9/1999 | Johnson | |
| 5,968,625 A | 10/1999 | Hudson | |

| | | | | | | |
|---|---|---|---|---|---|---|
| 5,985,397 A | 11/1999 | Witt et al. | | 6,675,545 B2 | 1/2004 | Chen et al. |
| 5,987,839 A | 11/1999 | Hamar et al. | | 6,681,820 B2 | 1/2004 | Olofsson |
| 6,006,486 A | 12/1999 | Moriau et al. | | 6,682,254 B1 | 1/2004 | Olofsson et al. |
| 6,023,907 A | 2/2000 | Pervan | | 6,685,993 B1 | 2/2004 | Hansson et al. |
| 6,065,262 A | 5/2000 | Motta | | 6,696,167 B2 * | 2/2004 | Sean et al. .................. 428/532 |
| 6,094,882 A | 8/2000 | Pervan | | 6,711,864 B2 | 3/2004 | Erwin |
| 6,101,778 A | 8/2000 | Martensson | | 6,711,869 B2 | 3/2004 | Tychsen |
| 6,119,423 A | 9/2000 | Costantino | | 6,715,253 B2 | 4/2004 | Pervan |
| 6,134,854 A | 10/2000 | Stanchfield | | 6,723,438 B2 | 4/2004 | Chang et al. |
| 6,148,884 A | 11/2000 | Bolyard et al. | | 6,729,091 B1 | 5/2004 | Martensson |
| 6,168,866 B1 | 1/2001 | Clark | | 6,745,534 B2 | 6/2004 | Kornfalt |
| 6,182,410 B1 | 2/2001 | Pervan | | 6,761,008 B2 | 7/2004 | Chen et al. |
| 6,186,703 B1 | 2/2001 | Shaw | | 6,761,794 B2 | 7/2004 | Mott et al. |
| 6,205,639 B1 | 3/2001 | Pervan | | 6,763,643 B1 | 7/2004 | Martensson |
| 6,209,278 B1 | 4/2001 | Tychsen | | 6,766,622 B1 | 7/2004 | Thiers |
| 6,216,403 B1 | 4/2001 | Belbeoc'h | | 6,769,217 B2 | 8/2004 | Nelson |
| 6,216,409 B1 | 4/2001 | Roy et al. | | 6,769,218 B2 | 8/2004 | Pervan |
| D442,296 S | 5/2001 | Külik | | 6,769,835 B2 | 8/2004 | Stridsman |
| D442,297 S | 5/2001 | Külik | | 6,772,568 B2 | 8/2004 | Thiers et al. |
| D442,298 S | 5/2001 | Külik | | 6,786,019 B2 | 9/2004 | Thiers |
| D442,706 S | 5/2001 | Külik | | 6,803,109 B2 | 10/2004 | Qiu et al. |
| D442,707 S | 5/2001 | Külik | | 6,805,951 B2 | 10/2004 | Kornfält et al. |
| 6,224,698 B1 | 5/2001 | Endo | | 6,823,638 B2 | 11/2004 | Stanchfield |
| 6,238,798 B1 | 5/2001 | Kang et al. | | 6,841,023 B2 | 1/2005 | Mott |
| 6,247,285 B1 | 6/2001 | Moebus | | 2001/0029720 A1 | 10/2001 | Pervan |
| D449,119 S | 10/2001 | Külik | | 2001/0034992 A1 | 11/2001 | Pletzer et al. |
| D449,391 S | 10/2001 | Külik | | 2002/0007608 A1 | 1/2002 | Pervan |
| D449,392 S | 10/2001 | Külik | | 2002/0007609 A1 | 1/2002 | Pervan |
| 6,324,803 B1 | 12/2001 | Pervan | | 2002/0014047 A1 | 2/2002 | Thiers |
| 6,345,481 B1 | 2/2002 | Nelson | | 2002/0020127 A1 | 2/2002 | Thiers et al. |
| 6,363,677 B1 | 4/2002 | Chen et al. | | 2002/0046528 A1 | 4/2002 | Pervan et al. |
| 6,397,547 B1 | 6/2002 | Martensson | | 2002/0056245 A1 | 5/2002 | Thiers |
| 6,418,683 B1 | 7/2002 | Martensson et al. | | 2002/0106439 A1 | 8/2002 | Cappelle |
| 6,421,970 B1 | 7/2002 | Martensson et al. | | 2002/0160680 A1 | 10/2002 | Laurence et al. |
| 6,427,408 B1 | 8/2002 | Krieger | | 2003/0024200 A1 | 2/2003 | Moriau et al. |
| 6,436,159 B1 | 8/2002 | Safta et al. | | 2003/0024201 A1 | 2/2003 | Moriau et al. |
| 6,438,919 B1 | 8/2002 | Knauseder | | 2003/0029115 A1 | 2/2003 | Moriau et al. |
| 6,446,405 B1 | 9/2002 | Pervan | | 2003/0029116 A1 | 2/2003 | Moriau et al. |
| 6,449,913 B1 | 9/2002 | Shelton | | 2003/0029117 A1 | 2/2003 | Moriau et al. |
| 6,449,918 B1 | 9/2002 | Nelson | | 2003/0033777 A1 | 2/2003 | Thiers et al. |
| 6,453,632 B1 | 9/2002 | Huang | | 2003/0033784 A1 | 2/2003 | Pervan |
| 6,458,232 B1 | 10/2002 | Valentinsson | | 2003/0115812 A1 | 6/2003 | Pervan |
| 6,460,306 B1 | 10/2002 | Nelson | | 2003/0115821 A1 | 6/2003 | Pervan |
| 6,461,636 B1 | 10/2002 | Arth et al. | | 2003/0159385 A1 | 8/2003 | Thiers |
| 6,465,046 B1 | 10/2002 | Hansson et al. | | 2003/0167717 A1 | 9/2003 | Garcia |
| 6,490,836 B1 | 12/2002 | Moriau et al. | | 2003/0196405 A1 | 10/2003 | Pervan |
| 6,497,961 B2 | 12/2002 | Kang et al. | | 2003/0205013 A1 | 11/2003 | Garcia |
| 6,510,665 B2 | 1/2003 | Pervan | | 2003/0233809 A1 | 12/2003 | Pervan |
| 6,516,579 B1 | 2/2003 | Pervan | | 2004/0016196 A1 | 1/2004 | Pervan |
| 6,517,935 B1 | 2/2003 | Kornfalt et al. | | 2004/0035078 A1 | 2/2004 | Pervan |
| 6,519,912 B1 | 2/2003 | Eckmann et al. | | 2004/0092006 A1 | 5/2004 | Lindekens et al. |
| 6,521,314 B2 | 2/2003 | Tychsen | | 2004/0101649 A1 * | 5/2004 | Thoma ........................ 428/54 |
| 6,532,709 B2 | 3/2003 | Pervan | | 2004/0105994 A1 | 6/2004 | Lu et al. |
| 6,533,855 B1 | 3/2003 | Gaynor et al. | | 2004/0139678 A1 | 7/2004 | Pervan |
| 6,536,178 B1 | 3/2003 | Pervan | | 2004/0159066 A1 | 8/2004 | Thiers et al. |
| 6,546,691 B2 | 4/2003 | Leopolder | | 2004/0177584 A1 | 9/2004 | Pervan |
| 6,553,724 B1 | 4/2003 | Bigler | | 2004/0200165 A1 | 10/2004 | Garcia et al. |
| 6,558,754 B1 | 5/2003 | Velin et al. | | 2004/0206036 A1 | 10/2004 | Pervan |
| 6,565,919 B1 | 5/2003 | Hansson et al. | | 2004/0237447 A1 | 12/2004 | Thiers et al. |
| 6,569,272 B2 | 5/2003 | Tychsen | | 2004/0237448 A1 | 12/2004 | Thiers et al. |
| 6,588,166 B2 | 7/2003 | Martensson et al. | | 2004/0241374 A1 | 12/2004 | Thiers et al. |
| 6,591,568 B1 | 7/2003 | Palsson | | 2004/0244322 A1 | 12/2004 | Thiers et al. |
| 6,601,359 B2 | 8/2003 | Olofsson | | 2004/0250493 A1 | 12/2004 | Thiers et al. |
| 6,606,834 B2 | 8/2003 | Martensson et al. | | 2004/0255541 A1 | 12/2004 | Thiers et al. |
| 6,617,009 B1 | 9/2003 | Chen et al. | | 2004/0258907 A1 | 12/2004 | Kornfalt et al. |
| 6,625,943 B1 * | 9/2003 | Renner ........................ 52/251 | | 2005/0003149 A1 | 1/2005 | Kornfalt et al. |
| 6,635,174 B1 | 10/2003 | Berg et al. | | 2005/0016099 A1 | 1/2005 | Thiers |
| 6,641,629 B2 | 11/2003 | Safta et al. | | | | |
| 6,646,088 B2 | 11/2003 | Fan et al. | | FOREIGN PATENT DOCUMENTS | | |
| 6,647,690 B1 | 11/2003 | Martensson | | | | |
| 6,649,687 B1 | 11/2003 | Gheewala et al. | | AU | 551 000 A | 4/1986 |
| 6,659,097 B1 | 12/2003 | Houston | | AU | 713628 | 5/1998 |
| 6,672,030 B2 | 1/2004 | Schulte | | AU | 200 020703 | 1/2000 |

| | | | | | | |
|---|---|---|---|---|---|---|
| BE | 417526 | 9/1936 | | EP | 0 248127 | 12/1987 |
| BE | 557844 | 6/1957 | | EP | 0248127 | 12/1987 |
| BE | 557844 | 3/1960 | | EP | 0481941 A1 * | 4/1992 |
| BE | 09 600527 | 6/1998 | | EP | 0623724 | 11/1994 |
| BE | 09 700344 | 10/1998 | | EP | 0652340 | 5/1995 |
| CA | 991373 | 6/1976 | | EP | 0667936 | 8/1995 |
| CA | 2226286 | 12/1997 | | EP | 0 690185 | 1/1996 |
| CA | 2252791 | 5/1999 | | EP | 0849416 | 6/1998 |
| CA | 2 289309 | 7/2000 | | EP | 0698162 | 9/1998 |
| CH | 200949 | 1/1939 | | EP | 0903451 | 3/1999 |
| CH | 211877 | 1/1941 | | EP | 0855482 | 12/1999 |
| CH | 562377 | 5/1975 | | EP | 0877130 | 1/2000 |
| DE | 314207 | 9/1919 | | EP | 0969163 | 1/2000 |
| DE | 531989 | 8/1931 | | EP | 0969164 | 1/2000 |
| DE | 740235 | 10/1943 | | EP | 0974713 | 1/2000 |
| DE | 1089966 | 9/1960 | | EP | 0843763 | 10/2000 |
| DE | 1534278 | 2/1966 | | EP | 1200690 | 5/2002 |
| DE | 1212225 | 3/1966 | | EP | 1219 409 A | 7/2002 |
| DE | 1212275 | 3/1966 | | EP | 0958441 | 7/2003 |
| DE | 1534802 | 4/1970 | | EP | 1026341 | 8/2003 |
| DE | 7 102476 | 6/1971 | | ES | 163421 | 9/1968 |
| DE | 7102476 | 6/1971 | | ES | 460194 | 5/1978 |
| DE | 2007129 | 9/1971 | | ES | 283331 | 5/1985 |
| DE | 1534278 | 11/1971 | | ES | 1019585 | 12/1991 |
| DE | 2 252643 | 10/1972 | | ES | 1019585 | 1/1992 |
| DE | 2238660 | 2/1974 | | ES | 2168045 | 5/2002 |
| DE | 7402354 | 5/1974 | | FI | 843060 | 8/1984 |
| DE | 2502992 | 7/1976 | | FR | 1293043 | 4/1962 |
| DE | 26 06 666 | 8/1977 | | FR | 2691491 | 11/1983 |
| DE | 2606666 * | 8/1977 | | FR | 2568295 | 5/1986 |
| DE | 2616077 | 10/1977 | | FR | 2623544 | 5/1989 |
| DE | 2917025 | 11/1980 | | FR | 2630149 | 10/1989 |
| DE | 7911924 | 3/1981 | | FR | 2637932 | 4/1990 |
| DE | 7928703 | 5/1981 | | FR | 2675174 | 10/1991 |
| DE | 3041781 | 6/1982 | | FR | 2667639 | 4/1992 |
| DE | 3214207 | 11/1982 | | FR | 2691491 | 11/1993 |
| DE | 8226153 | 1/1983 | | FR | 2697275 | 4/1994 |
| DE | 3343601 | 6/1985 | | FR | 2712329 | 5/1995 |
| DE | 86 040049 | 6/1986 | | FR | 2776956 | 10/1999 |
| DE | 3512204 | 10/1986 | | FR | 2781513 | 1/2000 |
| DE | 3 246376 | 2/1987 | | FR | 2785633 | 5/2000 |
| DE | 4004891 | 9/1990 | | GB | 424057 | 2/1935 |
| DE | 4002547 | 8/1991 | | GB | 585205 | 1/1947 |
| DE | 93 02 447 U1 | 4/1993 | | GB | 599793 | 3/1948 |
| DE | 4134452 | 4/1993 | | GB | 636423 | 4/1950 |
| DE | 4215273 | 11/1993 | | GB | 812671 | 4/1959 |
| DE | 4242530 | 6/1994 | | GB | 1033866 | 6/1966 |
| DE | 4011656 | 1/1995 | | GB | 1034117 | 6/1966 |
| DE | 4324137 | 1/1995 | | GB | 1044846 | 10/1966 |
| DE | 4107151 | 2/1995 | | GB | 1237744 | 6/1968 |
| DE | 295 11 984 U | 11/1995 | | GB | 1127915 | 9/1968 |
| DE | 29 517128 | 2/1996 | | GB | 1275511 | 5/1972 |
| DE | 4242530 | 9/1996 | | GB | 1399402 | 7/1975 |
| DE | 3544845 | 12/1996 | | GB | 1430423 | 3/1976 |
| DE | 29 710175 | 9/1997 | | GB | 2117813 | 10/1983 |
| DE | 297 13 040 U | 11/1997 | | GB | 2126106 | 3/1984 |
| DE | 19 616510 | 3/1998 | | GB | 2152063 | 7/1985 |
| DE | 19 651149 | 6/1998 | | GB | 2238660 | 6/1991 |
| DE | 19 709641 | 9/1998 | | GB | 2243381 | 10/1991 |
| DE | 19 718319 | 11/1998 | | GB | 2256023 | 11/1992 |
| DE | 19 735189 | 6/2000 | | GB | 2 306 389 A | 5/1997 |
| DE | 20 001225 | 8/2000 | | JP | 54-65528 | 5/1979 |
| DE | 19 925248 | 12/2000 | | JP | 57-119056 | 7/1982 |
| DE | 20 017461 | 3/2001 | | JP | 59-186336 | 10/1984 |
| DE | 20 018284 | 3/2001 | | JP | 3-169967 | 7/1991 |
| DE | 1001 01 227 C | 5/2001 | | JP | 4-106264 | 4/1992 |
| DE | 200 17058 U | 6/2001 | | JP | 5-148984 | 6/1993 |
| DE | 201 05 808 U | 8/2001 | | JP | 6-56310 | 5/1994 |
| DE | 100 55 481 A1 | 5/2002 | | JP | 6-146553 | 5/1994 |
| DE | 20 206460 | 8/2002 | | JP | 6-200611 | 7/1994 |
| DE | 201 09 675 U1 | 10/2002 | | JP | 6-320510 | 11/1994 |
| DE | 202 11 956 U1 | 3/2003 | | JP | 7-76923 | 3/1995 |
| DE | 20 218331 | 5/2004 | | JP | 7-180333 | 7/1995 |

| | | | | | | |
|---|---|---|---|---|---|---|
| JP | 7-300979 | 11/1995 | | WO | 89/08539 | 9/1989 |
| JP | 7-310426 | 11/1995 | | WO | 92/17657 | 10/1992 |
| JP | 8-109734 | 4/1996 | | WO | 93/13280 | 7/1993 |
| JP | 8-270193 | 10/1996 | | WO | 93/19910 | 10/1993 |
| NE | 7 601773 | 2/1976 | | WO | 94/01628 | 1/1994 |
| NO | 157871 | 2/1988 | | WO | 94/26999 | 11/1994 |
| NO | 305614 | 6/1999 | | WO | 94 26999 | 11/1994 |
| RU | 363795 | 12/1972 | | WO | 95/06176 | 3/1995 |
| SE | 711 4900-9 | 9/1974 | | WO | 96/27719 | 9/1996 |
| SE | 450411 | 6/1987 | | WO | 96/27721 | 9/1996 |
| SE | 450141 | 9/1987 | | WO | 96/30177 | 10/1996 |
| SE | 501014 | 10/1994 | | WO | 97/47834 | 12/1997 |
| SE | 501914 | 6/1995 | | WO | 98/24495 | 6/1998 |
| SE | 502994 | 4/1996 | | WO | 98/24994 | 6/1998 |
| SE | 506254 | 11/1997 | | WO | 98/38401 | 9/1998 |
| SE | 509059 | 11/1998 | | WO | 99 140273 | 8/1999 |
| SE | 509060 | 11/1998 | | WO | 99/66151 | 12/1999 |
| SE | 512290 | 2/2000 | | WO | 99 66152 | 12/1999 |
| SE | 512313 | 2/2000 | | WO | 00 06854 | 2/2000 |
| SE | 0000200-6 | 8/2001 | | WO | 00 66856 | 11/2000 |
| WO | 84/02155 | 6/1984 | | WO | 01 66876 | 9/2001 |
| WO | 87/03839 | 7/1987 | | | | |

* cited by examiner

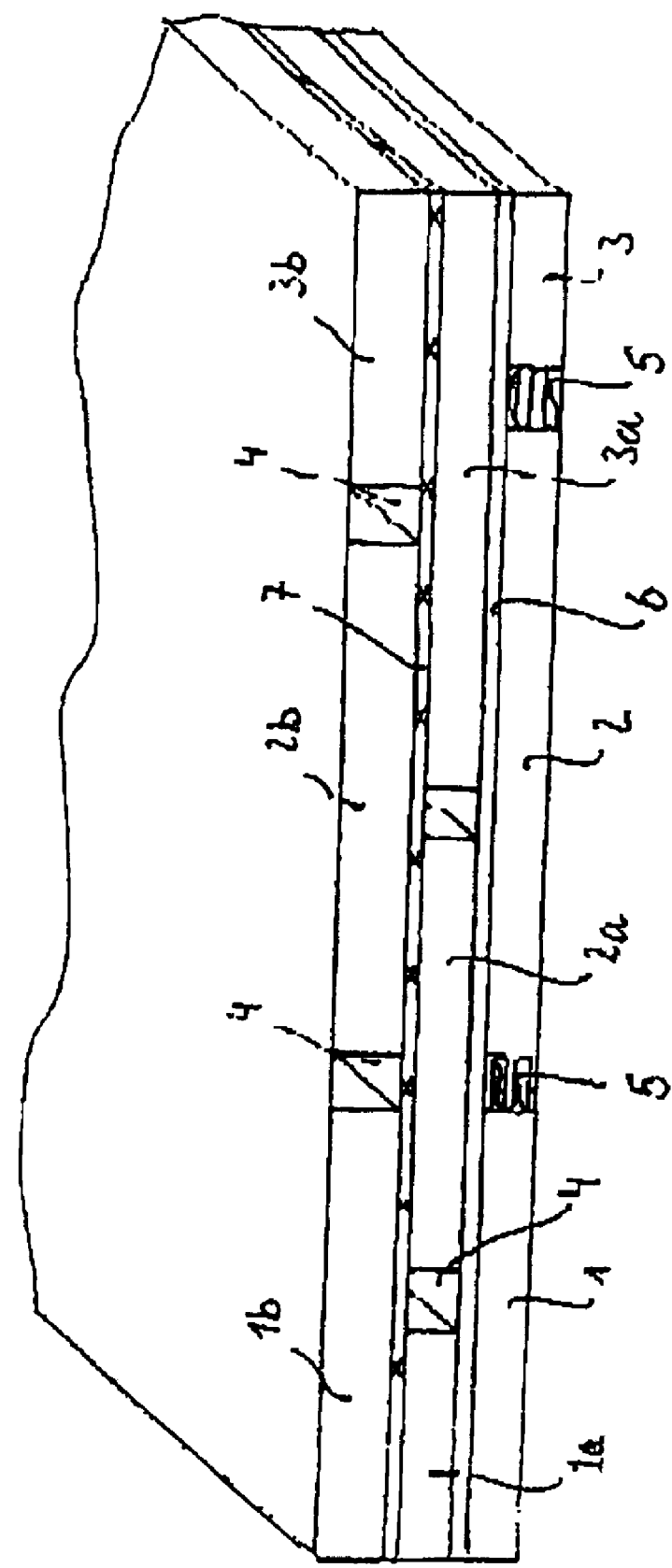

BUILDING BOARD

FIELD OF THE INVENTION

The invention relates to a building board for use as a ceiling or wall element in house building.

BACKGROUND DESCRIPTION

Intermediate ceilings are employed in houses as stacked board ceilings, as boarded floors which are laid and fastened onto exposed and unexposed joists, and as concrete solid ceilings. These ceilings have to be prepared on the spot, so they take a correspondingly long time to make. In prefabricated house building, prefabricated stacked board elements are used.

Unless they are brick-built or cast from concrete, wall are made in post-and-beam construction, i.e. a trussing is erected, which is lined with timber-based material or plaster boards.

SUMMARY OF THE INVENTION

The object of the invention is to provide a building board for use as a ceiling or wall element in house building, which can be used as a prefabricated element, has good heat-insulating and sound-insulating properties and is cheap to produce.

To achieve the object, the building board is distinguished by a plurality of OSBs which are disposed side by side and are bonded together in multiple layers.

The connection of a plurality of boards to form a number of mutually offset layers creates a highly stable building board, which is nevertheless light. OSB (orientated strand board) has good mechanical properties.

In order to increase the stability of the building board, the layers of a plurality of boards are preferably additionally connected by mechanical connecting means (nails, screws, clamps). Manufacture is simplified if, between the individual layers, nail plates are employed for additional fastening.

In order to increase the sound-insulation and heat-insulation, a plastics mat can be provided between the layers.

The impact sound properties can be improved if interspaces are provided between the boards of a layer. These interspaces can also be filled with an insulating material.

The building board has a length of 2 to 20 m, especially 2 to 10 m or 4 to 6 m. The thickness measures 50 to 900 mm, especially 100 to 400 mm or 100 to 250 mm.

BRIEF DESCRIPTION OF THE DRAWINGS

An illustrative embodiment of the invention shall be described below with the aid of the drawing, which shows a perspective representation of a building board.

FIG. 1 is a schematic diagram of the building board of the invention.

DETAILED DESCRIPTION OF EMBODIMENTS OF THE INVENTION

The building board consists of a plurality of OSBs 1, 2, 3; 1a, 2a, 3a; 1b, 2b, 3b, which are bonded together one on top of the other to form multiple layers. As the adhesive, amino resins, especially melamine-reinforced urea resins, MUF, phenolic and resorcinol resins, or polyurethane-based and cyanate-based adhesives, as well as vinyl acetate-based, especially PVAc-based adhesives, may be used. The surface of the OSBs can be ground or non-ground. The individual boards 1, 2, 3, . . . can have a thickness between 8 and 60 mm. Between individual boards 1a, 2a, 3a, . . . of a layer, interspaces 4 might be provided. These interspaces 4 can be filled with an insulating material 5. The interspaces 4 improve the sound-insulating properties, which can be improved still further if the interspaces 4 are filled with insulating material 5. The interspaces 4 are about 20 mm wide. The heat-insulating and sound-insulating properties can be further enhanced if plastics mats 6 are provided between the individual layers.

In order to support the bonding of the individual layers, nail plates 7 can be provided. In addition, the individual layers can also be nailed, screwed or clamped together.

With the building board, spans of 4 to 10 m, preferably between 4 and 6 m, can be achieved in ceilings. In the case of walls, a span of 2 to 20 m and a width of 2 to 10 m can be achieved. The thickness of the building board for use as a ceiling element measures between 5 and 90 cm, preferably between 10 and 40 cm. The thickness of a wall element measures between 5 and 30 cm, preferably between 10 and 25 cm.

The invention claimed is:

1. A building board for use as a ceiling or wall element in house building, comprising a plurality of orientated strand boards (OSBs) which are disposed side by side and are bonded together in multiple layers, further comprising some interspaces filled with an insulating material and other interspaces devoid of the insulating material, at least one nail plate disposed between respectively two layers lying one on top of the other, and at least one plastic mat disposed between two layers lying one on top of the other.

2. The building board as claimed in claim 1, wherein the layers of a plurality of boards are additionally connected to one another by mechanical connecting means.

3. The building board as claimed in claim 2, wherein the at least one plastic mat is structured and arranged to increase the sound-insulation and heat insulation of the building board.

4. The building board as claimed in claim 3, wherein:
the plurality of OSBs have a thickness of 100 mm to 250 mm,
the plurality of OSBs have a length of 4 m to 6 m, and
the interspaces are about 20 mm wide.

5. The building board as claimed in claim 1 wherein the plurality of OSBs have a length of 2-20 m.

6. The building board as claimed in claim 5, wherein the plurality of OSBs have a length of one of 2-10 m or 4-6 m.

7. The building board as claimed in claim 5, wherein the plurality of OSBs have a thickness of one of 100-400 mm or 100-250 mm.

8. The building board of claim 1, wherein:
the some interspaces filled with an insulating material are provided in a first layer of the plurality of boards, and
the other interspaces devoid of the insulating material are provided in a second layer of the plurality of boards.

9. The building board as claimed in claim 1, wherein:
the interspaces filled with insulating material are disposed in an outermost layer of the plurality of orientated strand boards, and
the interspaces devoid of insulating material are disposed in a second layer adjacent the outermost layer.

10. The building board as claimed in claim 9, wherein the at least one plastic mat is structured and arranged to increase the sound-insulation and heat insulation of the building board,
wherein the at least one plastic mat is disposed between the outermost layer and the second layer, and
the at least one nail plate is disposed between the second layer and a third layer of the plurality of orientated strand boards.

* * * * *